United States Patent
Kauzunovich et al.

(10) Patent No.: US 10,359,041 B2
(45) Date of Patent: Jul. 23, 2019

(54) MODULATING PUMP LEVER

(71) Applicant: FLUKE CORPORATION, Everett, WA (US)

(72) Inventors: Sergei Kauzunovich, Manchester, NH (US); Charles Elbert Marzette, Jr., Kirkland, WA (US); Gregory Lindstrom, Candia, NH (US); Mark Desmarais, Derry, NH (US)

(73) Assignee: Fluke Corporation, Everett, WA (US)

( * ) Notice: Subject to any disclaimer, the term of this patent is extended or adjusted under 35 U.S.C. 154(b) by 316 days.

(21) Appl. No.: 15/167,716

(22) Filed: May 27, 2016

(65) Prior Publication Data

US 2017/0342974 A1 Nov. 30, 2017

(51) Int. Cl.
| | | |
|---|---|---|
| *G01L 7/00* | (2006.01) | |
| *F04B 17/03* | (2006.01) | |
| *F04B 35/04* | (2006.01) | |
| *F04B 39/00* | (2006.01) | |
| *F04B 39/10* | (2006.01) | |
| *F04B 39/12* | (2006.01) | |
| *F04B 49/22* | (2006.01) | |
| *F04B 53/10* | (2006.01) | |
| *F04B 53/16* | (2006.01) | |
| *F04B 53/14* | (2006.01) | |

(52) U.S. Cl.
CPC ............. *F04B 49/22* (2013.01); *F04B 17/03* (2013.01); *F04B 35/04* (2013.01); *F04B 39/0005* (2013.01); *F04B 39/10* (2013.01); *F04B 39/121* (2013.01); *F04B 53/10* (2013.01); *F04B 53/14* (2013.01); *F04B 53/16* (2013.01); *G01L 7/00* (2013.01)

(58) Field of Classification Search
CPC .......... F04B 49/22; F04B 53/16; F04B 39/10; F04B 17/03; F04B 53/10; F04B 39/121; F04B 39/0005; F04B 35/04; G01L 7/00; G01L 15/00; G01L 13/00; F15B 9/04; F15B 60/42; F15B 60/388; F15B 60/389; F15B 60/391; F15B 60/434; F15B 60/446; F15B 60/327
See application file for complete search history.

(56) References Cited

U.S. PATENT DOCUMENTS

| | | | | |
|---|---|---|---|---|
| 5,866,822 A | * | 2/1999 | Willig | B60T 7/042 73/719 |
| 2005/0001567 A1 | * | 1/2005 | Yoshimatsu | E02F 9/2075 318/34 |
| 2006/0014999 A1 | * | 1/2006 | Heilman | A61M 1/1046 600/16 |
| 2010/0320956 A1 | * | 12/2010 | Lumsden | H02P 6/182 318/799 |
| 2012/0324865 A1 | * | 12/2012 | Habumuremyi | F01N 3/208 60/274 |

* cited by examiner

*Primary Examiner* — Devon C Kramer
*Assistant Examiner* — David N Brandt
(74) *Attorney, Agent, or Firm* — Seed IP Law Group LLP

(57) ABSTRACT

An apparatus includes a chamber, a valve coupled to the chamber, a pump coupled to the chamber, a control circuit coupled to the pump, and a lever coupled to the valve, the pump, and the control circuit. Operation of the valve and the pump is controlled based on a position of the lever.

19 Claims, 6 Drawing Sheets

MODULATING PUMP LEVER

BACKGROUND

Technical Field

The present disclosure relates to control systems and more particularly to systems for controlling the pressure within an apparatus used to test pressure measuring instruments.

Description of the Related Art

A pressure measuring instrument may be tested by fluidly coupling the pressure measuring instrument to a pressure comparator. A highly accurate reference pressure gauge also is fluidly coupled to the pressure comparator. A pump within the pressure comparator is used to develop a predetermined pressure within a chamber of the pressure comparator. To determine the accuracy of the pressure measuring instrument, a pressure measured by the pressure measuring instrument is compared to a pressure measured by the reference pressure gauge. Typically, this process is repeated for a plurality of predetermined pressures within a range of pressures for which the pressure measuring instrument is rated to measure. For example, if the pressure measuring instrument is rated to measure a maximum pressure of 300 pounds per square inch (psi), the predetermined pressures may include 15 psi, 30 psi, 60 psi, 150 psi, and 300 psi, which correspond to 5%, 10%, 20%, 50%, and 100% of the maximum pressure value, respectively.

A conventional pressure comparator may include an electric pump that is used to develop pressure within a chamber of the pressure comparator and a first lever coupled to a switch that can turn the pump on and off. While the first lever is at a first position, the switch is open and no power is provided to the pump and, thus, the pump does not operate. While the first lever is at a second position, the switch is closed and power is provided to the pump and, thus, the pump operates to increase or decrease the pressure within the chamber. That is, in a conventional pressure comparator, either no power or full power is provided to the pump depending on whether the first lever is at the first position or the second position. While full power is provided to the pump, the pump operates at its maximum capacity. The conventional pressure comparator also includes a second lever that is coupled to a bleed valve, which is coupled to the chamber. While the second lever is at a first position, the bleed valve is closed. While the second lever is at a second position, the bleed valve is open, which causes the pressure within the chamber to change slowly.

Typically, an operator of the conventional pressure comparator turns the pump on by moving the first lever from the first position to the second position while watching a display of the reference pressure gauge. After the pressure measured by the reference pressure gauge exceeds a set point (e.g., 50% of the maximum rated pressure of the pressure measuring instrument being tested), the operator turns the pump off by moving the first lever from the second position to the first position. Then, while watching the display of the reference pressure gauge, the operator moves the second lever from the first position to the second position, which causes the pressure within the chamber to decrease slowly. When the pressure measured by the reference pressure gauge is approximately equal to the set point, the operator closes the bleed valve by moving the second lever from the second position to the first position. The operator then turns a knob to adjust the position of a piston within a Vernier chamber, which causes the pressure within the chamber to change very slightly until the pressure measured by the reference pressure gauge is equal to the set point. The operator then compares the pressure measured by the pressure measuring instrument being tested to the pressure measured by the reference pressure gauge. If the pressure measured by the pressure measuring instrument is not equal to the pressure measured by the reference pressure gauge, the operator may calibrate the pressure measuring instrument so that the pressure measured by the pressure measuring instrument is equal to the pressure measured by the reference pressure gauge Because the pump of the conventional pressure comparator is either not operating or operating at full capacity, it can be difficult for the operator to accurately set the initial pressure within the chamber of the pressure comparator. For example, if the operator is attempting to set the pressure within the chamber to a set point corresponding to 5% of the maximum rated pressure of the pressure measuring instrument being tested, moving the first lever from the first position to the second position for a short period of time may cause the pressure within the chamber to exceed 10% of the maximum rated pressure of the pressure measuring instrument being tested. The operator then has to move the second lever to open the bleed valve and wait for the pressure to decrease to 5% of the maximum rated pressure, which can be time consuming. The operator must be mindful of which lever she is moving. If the operator intends to move the second lever, but accidentally moves the first lever, the pressure within the chamber is increased instead of decreased. The operator must then operate the second lever for a relatively long period of time to cause the pressure within the chamber to decrease to the set point.

Accordingly, there is a need for an apparatus that can be used to set the pressure within a chamber more quickly and easily.

BRIEF SUMMARY

An apparatus may be summarized as including a chamber; a first valve coupled to the chamber; a pump coupled to the chamber; a control circuit coupled to the pump; and a lever coupled to the pump, the first valve, and the control circuit, wherein operation of the pump and the first valve is controlled based on a position of the lever.

The apparatus may further include a second valve coupled to the chamber and the lever, wherein operation of the second valve is controlled based on the position of the lever.

The apparatus may further include a third valve coupled to the chamber and the lever, wherein operation of the third valve is controlled based on the position of the lever. While the lever is at a first position, the first, the second, and the third valves may be closed, and the control circuit may control the pump to be turned off. The lever may be biased to be in the first position while the lever is not actuated by an operator. While the lever is at a second position, the first valve may be open, the second and the third valves may be closed, and the control circuit may control the pump to be turned on. While the lever is at a third position, the first and the second valves may be open, the third valve may be closed, and the control circuit may control the pump to be turned off. While the lever is at a fourth position, the first and the third valves may be open, the second valve may be closed, and the control circuit may control the pump to be turned off. The control circuit, in operation, may provide a first control signal to the pump that may cause the pump to be turned on while the lever is disposed at a first position and at a second position, and a duty cycle of the first control signal while the lever is disposed at the first position may be different from the duty cycle of the first control signal while the lever is disposed at the second position. The control circuit, in operation, may receive a second control signal that may indicate a magnitude of a current flowing through the pump and, while the lever is disposed at the first position, the control circuit may increase the duty cycle of the first control signal upon determining that the magnitude of the current flowing through the pump is greater than a threshold current value for a period of time greater than a threshold period of time.

An apparatus may be summarized as including a first support arm; a first actuator pivotally mounted to the first support arm; a second support arm; a shaft rotatably mounted between the first and the second support arms; a second actuator mounted to the shaft, wherein rotation of the shaft causes rotation of the second actuator; a lever coupled to the shaft, wherein movement of the lever causes rotation of the shaft; a first valve disposed adjacent to the first actuator; a second valve disposed adjacent to the second actuator; a third valve disposed adjacent to the lever; a pump; and a control circuit coupled to the shaft, wherein operation of the pump, the first valve, the second valve, and the third valve is controlled based on a position of the lever. While the lever is at a first position, the first, the second, and the third valves may be closed, and the control circuit may control the pump to be off. The lever may be biased to be in the first position while the lever is not actuated by an operator. While the lever is at a second position, the first actuator may depress a plunger of the first valve causing the first valve to open, the second and the third valves may be closed, and the control circuit may control the pump to be on. While the lever is at a third position, the first actuator may depress the plunger of the first valve causing the first valve to open, the second actuator may depress a plunger of the second valve causing the second valve to open, the third valve may be closed, and the control circuit may control the pump to be off. While the lever is at a fourth position, the first actuator may depress the plunger of the first valve causing the first valve to open, the second valve may be closed, the lever may depress a plunger of the third valve causing the third valve to open, and the control circuit may control the pump to be off. The control circuit may provide a first control signal to the pump that causes the pump to be on while the lever is disposed at a first position and at a second position, and a duty cycle of the first control signal while the lever is disposed at the first position may be different from the duty cycle of the first control signal while the lever is disposed at the second position. The control circuit may receive a second control signal indicating a magnitude of a current flowing through the pump and, while the lever is disposed at the first position, the control circuit may increase the duty cycle of the first control signal upon determining that the magnitude of the current flowing through the pump is greater than a threshold current value for a period of time greater than a threshold period of time. The apparatus may include a first projection extending outwardly from a surface of the lever, wherein, while the lever is disposed at a first position, the first projection may contact the first actuator and the first actuator may depress a plunger of the first valve causing the first valve to open; and a second projection extending outwardly from the surface of the lever, wherein, while the lever is disposed at a second position, the second projection may contact the first actuator and the first actuator may depress the plunger of the first valve causing the first valve to open. The second actuator may include a cam. While the lever is disposed at a first position, the cam may depress a plunger of the second valve causing the second valve to open by a first amount and, while the lever is disposed at a second position, the cam may depress the plunger of the second valve causing the second valve to open by a second amount that is different from the first amount. The control circuit may include a variable resistor that is coupled to the shaft, and rotation of the shaft may change a resistance of the variable resistor.

DETAILED DESCRIPTION

Figure 1:
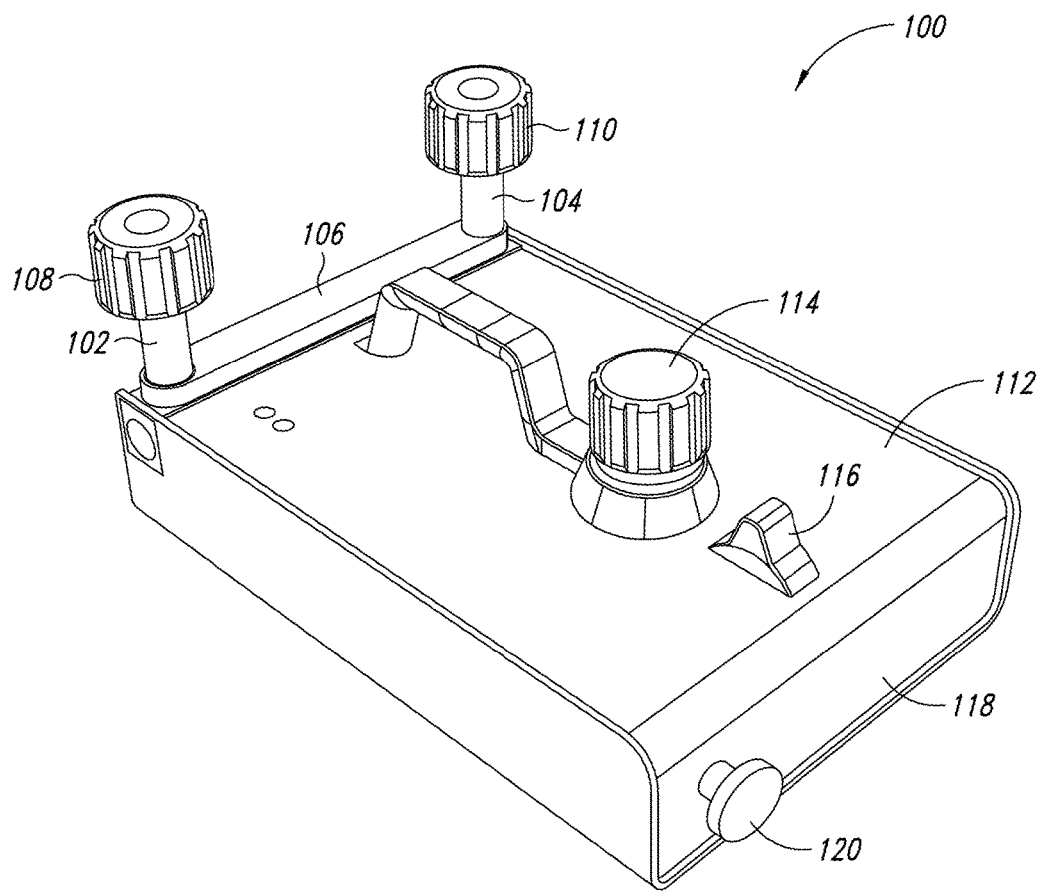
FIG. 1 is a perspective view of a pressure comparator apparatus according to one or more embodiments of the present disclosure.

FIG. 1 is a perspective view of a pressure comparator apparatus 100. The pressure comparator apparatus 100 includes a first test port 102 and a second test port 104, which are fluidly coupled to a manifold 106. In one or more embodiments, the manifold 106 includes apertures having threads formed therein that are complimentary to threads formed on lower portions of the first test port 102 and the second test port 104, which are used to couple the first test port 102 and the second test port 104 to the manifold 106.

The first test port 102 includes a first adapter 108 that is used to couple a reference pressure gauge (not shown) to the first test port 102. The second test port 104 includes a second adapter 110 that is used to couple a device under test (not shown) to the second test port 104. The device under test may be a pressure measuring instrument such as a dial gauge, a digital test gauge, or a pressure transmitter, for example.

The pressure comparator apparatus 100 includes a case having an upper surface 112 on which a knob 114 is disposed. Operation of the knob 114 is described in detail below. The upper surface 112 of the case of the pressure comparator apparatus 100 also includes a lever 116, which is described in detail below. The case of the pressure comparator apparatus 100 also includes a front surface 118 on which a knob 120 is disposed. Operation of the knob 120 is described in detail below.

Figure 2:
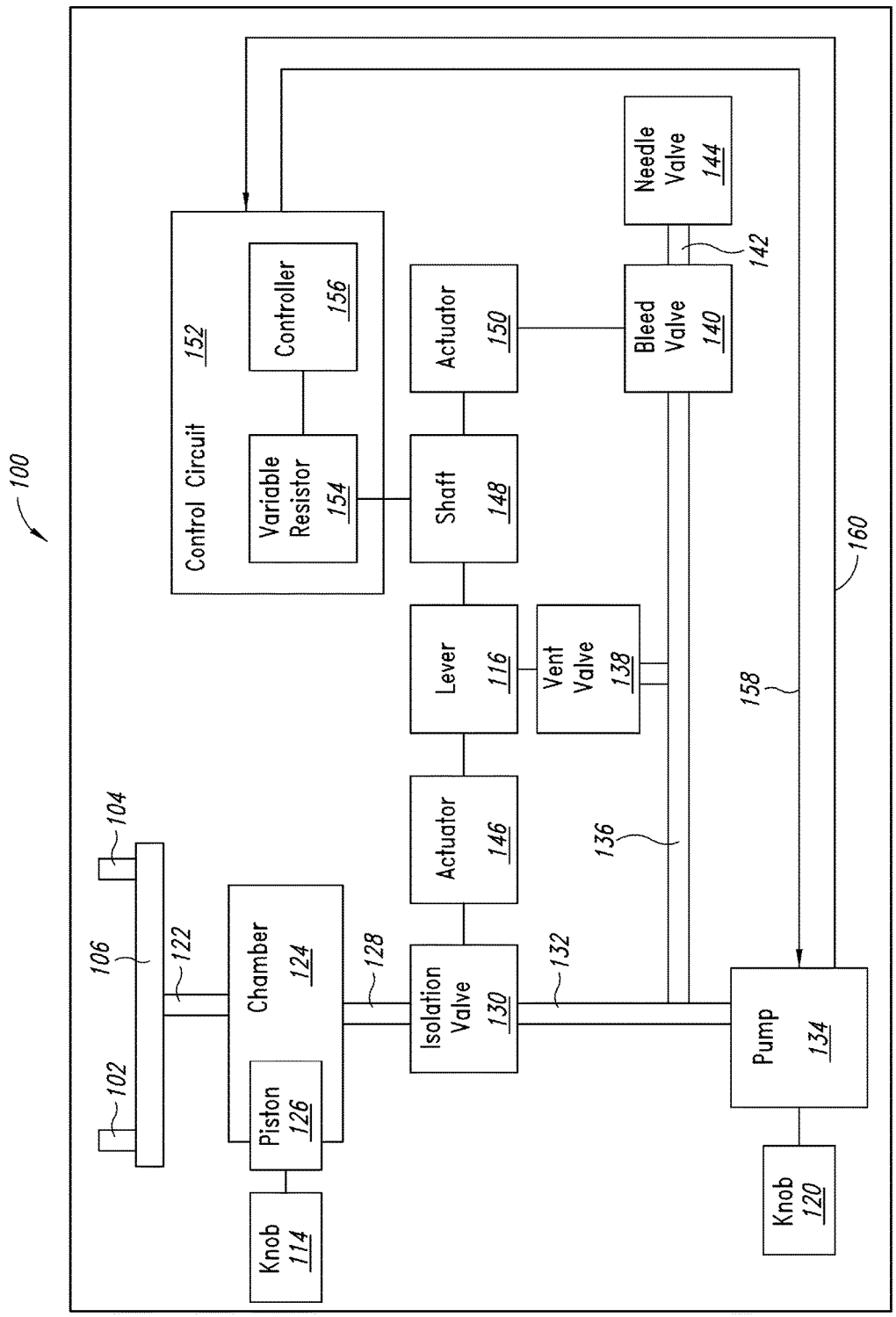
FIG. 2 is a block diagram of a pressure comparator apparatus according to one or more embodiments of the present disclosure.

FIG. 2 is a block diagram of the pressure comparator apparatus 100. The pressure comparator apparatus 100 includes a conduit 122 that fluidly couples the manifold 106 to a chamber 124. In one or more embodiments, the chamber 124 is a conventional Vernier chamber. A piston 126 is at least partially disposed within the chamber 124. The piston 126 is coupled to the knob 114 by a threaded shaft (not shown). An operator can rotate the knob 114 to adjust the amount of the piston 126 that is disposed within the chamber 124, which controls the volume that a fluid (e.g., air) can occupy within the chamber 124, which affects the pressure within the chamber 124.

For example, while the operator rotates the knob 114 in a clockwise direction, the piston 126 advances into the chamber 124, which causes the volume that the fluid can occupy within the chamber 124 to decrease, thereby causing the pressure within the chamber 124 to increase. Similarly, while the operator rotates the knob 114 in a counterclockwise direction, the piston 126 retracts from the chamber 124, which causes the volume that a fluid can occupy within the chamber 124 to increase, thereby causing the pressure within the chamber 124 to decrease.

A conduit 128 fluidly couples the chamber 124 to an isolation valve 130. In one or more embodiments, the isolation valve 130 is a conventional Schrader valve that is normally in a closed position. While a plunger of the isolation valve 130 is actuated (e.g., depressed), the isolation valve 130 is opened. While the plunger of the isolation valve 130 is not actuated, the isolation valve 130 is closed.

A conduit 132 fluidly couples the isolation valve 130 to a pump 134. In one or more embodiments, the pump 134 is a conventional pneumatic pump. While the isolation valve 130 is open, the conduits 128 and 132 fluidly couple the pump 134 to the chamber 124. Accordingly, while the pump 134 is operated and the isolation valve 130 is open, the pump 134 causes the pressure within the chamber 124 to increase or decrease.

An operator can move the knob 120 to control whether the pump 134 causes the pressure within the chamber 124 to increase or decrease. In other words, the position of the knob 120 controls whether the pump 134 causes positive or negative pressure to be developed within the chamber 124. More particularly, the knob 120 is mechanically coupled to a shuttle selection valve (not shown) that is fluidly coupled to the pump 134 and the conduit 132. While the knob 120 is at a first position, an output port of the pump 134 is connected to the conduit 132. Thus, the pump 134 causes the pressure within the chamber 124 to increase while the knob 120 is at the first position, the isolation valve 130 is open, and the pump 134 is turned on. Similarly, while the knob 120 is at a second position, an input port of the pump 134 is connected to the conduit 132. Thus, the pump 134 causes the pressure within the chamber 124 to decrease while the knob 120 is at the second position, the isolation valve 130 is open, and the pump 134 is turned on.

A conduit 136 is fluidly coupled to the conduit 132. While the isolation valve 130 is open, the conduits 128, 132, and 136 fluidly couple the chamber 124 to a vent valve 138 and a bleed valve 140. In one or more embodiments, the vent valve 138 and the bleed valve 140 are conventional Schrader valves that are normally in a closed position. While a plunger of the vent valve 138 is actuated (e.g., depressed), the vent valve 138 is opened. While the plunger of the vent valve 138 is not actuated, the vent valve 138 is closed. Similarly, while a plunger of the bleed valve 140 is actuated (e.g., depressed), the bleed valve 140 is opened. While the plunger of the bleed valve 140 is not actuated, the bleed valve 140 is closed.

The vent valve 138 is fluidly coupled to the environment in which the pressure comparator apparatus 100 is disposed. A conduit 142 fluidly couples the bleed valve 140 to a needle valve 144, which is fluidly coupled to the environment in which the pressure comparator apparatus 100 is disposed. In one or more embodiments, the needle valve 144 is a conventional needle valve that includes an aperture and a needle-shaped plunger, wherein an operator can control the amount of the needle-shaped plunger that is disposed within the aperture to regulate air flow through the needle valve 144. In one or more embodiments, the needle valve 144 is at least partially open during operation of the pressure comparator apparatus 100.

While the isolation valve 130 and the vent valve 138 are open, the chamber 124 is fluidly coupled to the environment in which the pressure comparator apparatus 100 is disposed. Accordingly, if the pump 134 previously developed positive pressure within the chamber 124, and the isolation valve 130 and the vent valve 138 are subsequently opened, the pressure within the chamber 124 is reduced. Similarly, if the pump 134 previously developed negative pressure within the chamber 124, and the isolation valve 130 and the vent valve 138 are subsequently opened, the pressure within the chamber 124 is increased.

In addition, while the isolation valve 130, the bleed valve 140, and the needle valve 144 are open, the chamber 124 is fluidly coupled to the environment in which the pressure comparator apparatus 100 is disposed. Accordingly, if the pump 134 previously developed positive pressure within the chamber 124, and the isolation valve 130 and the bleed valve 140 are subsequently opened, the pressure within the chamber 124 is reduced. Similarly, if the pump 134 previously developed negative pressure within the chamber 124, and the isolation valve 130 and the bleed valve 140 are subsequently opened, the pressure within the chamber 124 is increased.

The lever 116 controls whether each of the isolation valve 130, the vent valve, and the bleed valve 140 is open or closed. The lever 116 is mechanically coupled to an actuator 146, which is mechanically coupled to the isolation valve 130. In one or more embodiments, the actuator 146 is a lever arm. In one or more embodiments, while the actuator 146 is at a first position, the actuator 146 causes the isolation valve 130 to open; while the actuator 146 is not at the first position, the isolation valve 130 is closed.

Figure 6:
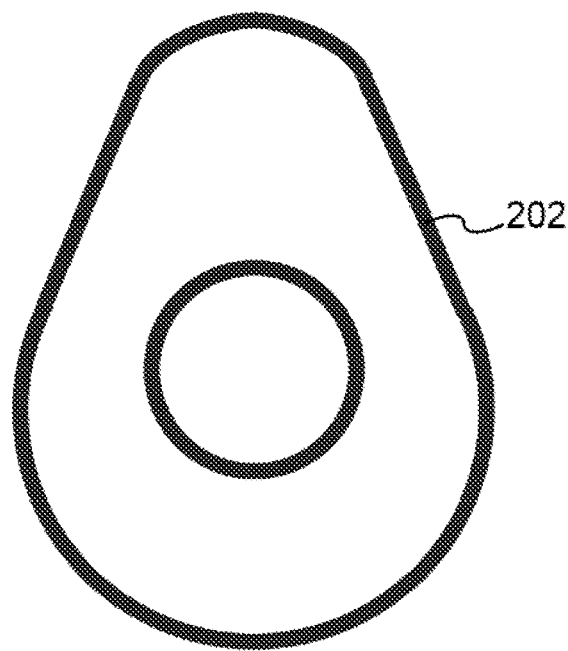
FIG. 6 is a side view of a cam according to one or more embodiments of the present disclosure.

The lever 116 also is mechanically coupled to a shaft 148, wherein movement of the lever 116 causes rotation of the shaft 148. The shaft 148 is mechanically coupled to an actuator 150, wherein rotation of the shaft 148 causes rotation of the actuator 150. In one or more embodiments, the actuator 150 is a cam 202 as shown in FIG. 6. As will be explained in detail below, while the lever 116 is disposed within a particular range of positions, the shaft 148 and the actuator 150 are rotated to a position where the actuator 150 causes the bleed valve 140 to open.

The shaft 148 also is mechanically coupled to a control circuit 152. In one or more embodiments, the control circuit 152 includes a variable resistor 154 and a controller 156. In one or more embodiments, the variable resistor 154 is a conventional potentiometer. In one or more embodiments, the controller 156 includes a conventional microprocessor and a non-transitory processor-readable storage medium or memory storing instructions that are executed by the microprocessor to cause the controller 156 to perform the functions described below. The shaft 148 is mechanically coupled to the variable resistor 154, wherein rotation of the shaft 148 causes the resistance of the variable resistor 154 to change.

In one or more embodiments, the control circuit 152 is arranged such that a predetermined voltage is supplied to the variable resistor 154 and a current flowing through the variable resistor 154 is provided to the controller 156, which determines the rotational angle of the shaft 148 based on the magnitude of the current. In one or more embodiments, the control circuit 152 is arranged such that a predetermined current is supplied to the variable resistor 154 and a voltage of the variable resistor 154 is provided to the controller 156, which determines the rotational angle of the shaft 148 based on the magnitude of the voltage.

The control circuit 152 provides a control signal 158 to the pump 134. In one or more embodiments, the control signal 158 is a pulse width modulated power signal that causes an electric motor (not shown) within the pump 134 to operate at a variety of speeds, depending on a duty cycle of the control signal 158. The duty cycle of the control signal 158 is a ratio of "on" time to "off" time within a predetermined period of time corresponding to one cycle. The control circuit 152 controls the duty cycle of the control signal 158 based on the resistance of the variable resistor 154, which depends on the rotational angle of the shaft 148. Accordingly, when the lever 116 causes the shaft 148 to rotate, the value of the resistance of the variable resistor 154 changes, which can cause the controller 156 to change the duty cycle of the control signal 158, thereby causing the speed of the motor within the pump 134 to change.

In one or more embodiments, the control circuit 152 monitors the speed of the motor within the pump 134 and, when the speed falls below a predetermined minimum threshold speed, the control circuit 152 increases the duty cycle of the control signal 158 so that the pump does not stall. This enables the pump 134 to operate at a slow, constant speed to slowly change the pressure within the chamber 124. In one or more embodiments, the pump 134 provides a control signal 160 to the control circuit 152, wherein the control signal 160 is indicative of the current flowing through the pump 134, which is indicative of the speed of the motor within the pump 134. If the control signal 160 indicates that the current flowing through the pump 134 is greater than a predetermined current value for longer than a predetermined period of time, the control circuit 152 increases the duty cycle of the control signal 158 by a predetermined amount. For example, if the control circuit 152 determines that the current flowing through the pump 134 is greater than a value corresponding to eight times a typical peak value for longer than 1.5 seconds, the control circuit 152 increases the duty cycle of the control signal 158 by 5%.

Operation of the lever 116 will now be described with reference to FIGS. 3A and 3B, which are side elevation views of the lever 116. In one or more embodiments, a reference line 300 corresponds to the upper surface 112 of the case of the pressure comparator apparatus 100. The lever 116 includes a first side surface 162 (shown in FIG. 3A), a second side surface 164 (shown in FIG. 3B) that is opposite the first side surface 162, and a knob portion 166 having a center portion 168. In one or more embodiment, the center portion 168 of the knob portion 166 is a center portion of the lever 116.

As described below, an operator applies a force to the knob portion 166 to control operation of the pressure comparator apparatus 100. An aperture 170 is formed through the lever 116 from the first side surface 162 to the second side surface 164 of the lever 116. A portion of the shaft 148 is disposed within the aperture 170 formed through the lever 116. The lever 116 is mechanically coupled to the shaft 148 such that rotation of the lever 116 causes rotation of the shaft 148. Rotation of the lever 116 about the shaft 148 is limited. More particularly, the lever 116 can be rotated such that a center portion 168 of the knob portion 166 is disposed between a position indicated by a reference line 302 and a position indicated by a reference line 304.

Figure 3A:
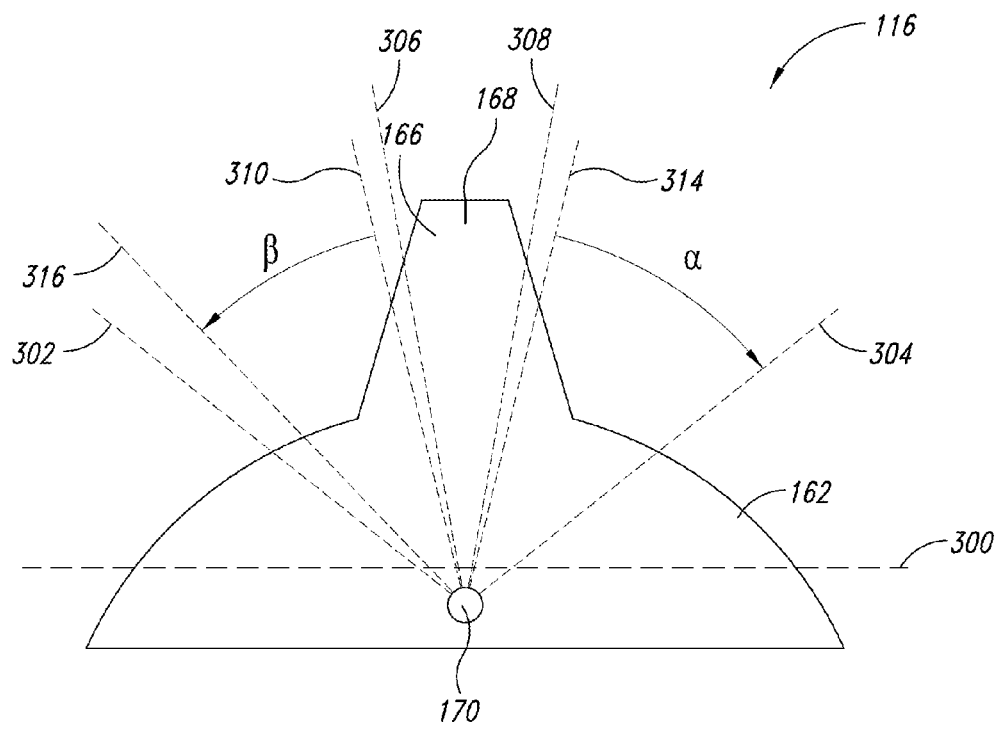
FIG. 3A is a side elevation view of a lever according to one or more embodiments of the present disclosure.
Figure 3B:
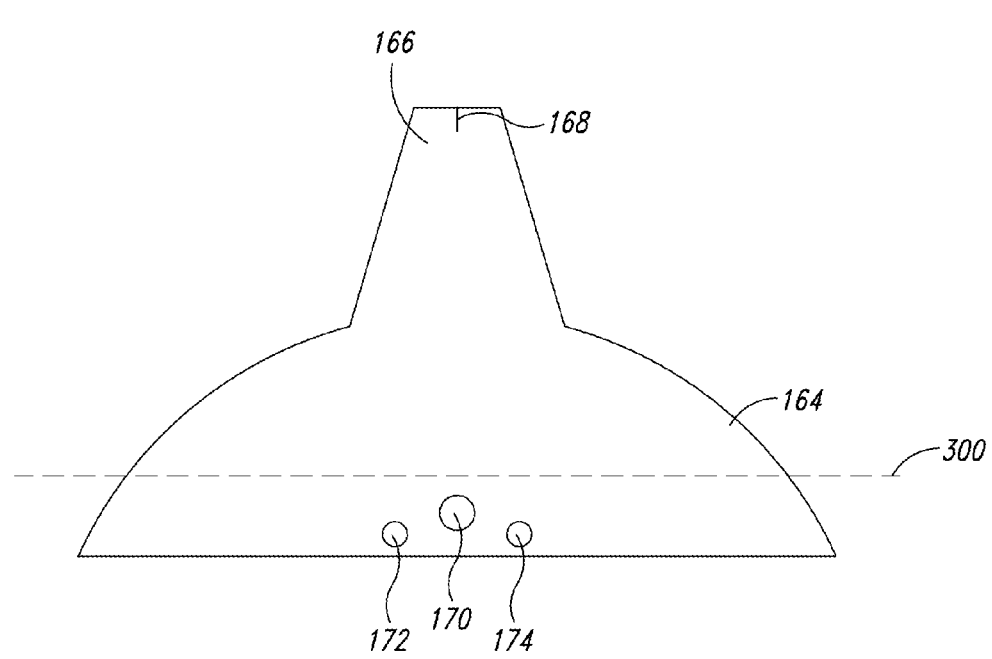
FIG. 3B is a side elevation view of a lever according to one or more embodiments of the present disclosure.

As shown in FIG. 3B, a first projection 172 and a second projection 174 extend outwardly from the second side surface 164. In one or more embodiments, each of the first projection 172 and the second projection 174 is a pin. While the center portion 168 of the lever 116 is disposed between positions indicated by reference lines 306 and 308, the isolation valve 130 is closed. While the center portion 168 of the lever 116 is disposed between positions indicated by reference lines 304 and 308, the first projection 172 causes the actuator 146 to open the isolation valve 130. Additionally, while the center portion 168 of the lever 116 is disposed between positions indicated by reference lines 302 and 306, the second projection 174 causes the actuator 146 to open the isolation valve 130.

While the center portion 168 of the lever 116 is disposed between positions indicated by reference lines 304 and 314, the control circuit 152 provides the control signal 158 to the pump 134, which causes the pump 134 to operate. In one or more embodiments, the control circuit 152 does not provide the control signal 158 to the pump 134, unless the center portion 168 of the lever 116 is disposed between the positions indicated by the reference lines 304 and 314.

In one or more embodiments, instructions stored in a memory of a microprocessor of the controller 156 cause the controller 156 to provide the control signal 158 to the pump 134 based on the value of the resistance of the variable resistor 154. For example, the memory stores a first voltage value corresponding to a voltage provided by the variable resistor 154 when the center portion 168 of the lever 116 is disposed at a position indicated by the reference line 304 and a second voltage value corresponding to the voltage provided by the variable resistor 154 when the center portion 168 of the lever 116 is disposed at the position indicated by reference line 314. The instructions stored in the memory of the microprocessor cause the controller 156 to provide the control signal 158 to the pump 134 while the voltage provided by the variable resistor 154 is greater than or equal to the first voltage value and less than or equal to the second voltage value.

In one or more embodiments, the control signal 158 has a duty cycle that depends on the value of the resistance of the variable resistor 154, wherein the closer the center portion 168 of the lever 116 is to the position indicated by the reference line 304, the greater the duty cycle of the control signal 158. For example, the controller 156 includes a microprocessor and a memory that stores a table or other data structure having a plurality of voltage values and a plurality duty cycle values, wherein each voltage value corresponds to one of the duty cycle values. Instructions stored in the memory cause the microprocessor to cause the controller 156 to output the control signal 158 with a duty cycle indicated by one of the stored duty cycle values while the variable resistor 154 provides to the microprocessor a voltage that is within a predetermined range (e.g., 2%) of the corresponding voltage value. Alternatively, the microprocessor may determine the duty cycle from a programmed equation that relates voltage values of the variable resistor 154 to a duty cycle of the control signal 158.

Stated differently, as an angle α formed between the center portion 168 of the lever 116 and the reference line 314 increases, the duty cycle of the control signal 158 increases. Thus, the duty cycle of the control signal 158 has a minimum value while the center portion 168 of the lever 116 is disposed at the position indicated by the reference line 314. Similarly, the duty cycle of the control signal 158 has a maximum value while the center portion 168 of the lever 116 is disposed at the position indicated by the reference line 304.

The rate at which the pump 134 changes the pressure within the chamber 124 is proportional to the rate at which the motor of the pump 134 operates, which is proportional to the duty cycle of the control signal 158 provided by the control circuit 152. Thus, the pressure within the chamber 124 changes most quickly while the duty cycle of the control signal 158 has a maximum value. Accordingly, if an operator would like to quickly change the pressure within the chamber 124, the operator would position the center portion 168 of the lever 116 at the position indicated by the reference line 304.

For example, if an operator would like to quickly cause the pressure within the chamber 124 to increase while adjusting the pressure within the chamber 124 to a set point, the operator would move the lever 116 to the position indicated by the reference line 304. As the pressure within the chamber 124 approaches the set point, the operator can move the lever 116 away from the position indicated by the reference line 304 toward the position indicated by the reference line 314, to more slowly increase the pressure within the chamber 124. Once the pressure within the chamber 124 is approximately equal to the set point, the operator can rotate the lever 116 to a position between the reference lines 306 and 308, which causes the isolation valve 130 to close and the pump 134 to turn off.

The purpose of the vent valve 138 is to quickly change the pressure within the chamber 124, for example, after testing using the pressure comparator apparatus 100 has been completed. In one or more embodiments, the lever 116 causes the vent valve 138 to open only while the center portion 168 of the lever 116 is disposed between positions indicated by reference lines 302 and 316. The vent valve 138 is fully opened when the center portion 168 of the lever 116 is disposed between the reference line 302 and the reference line 316, which causes the pressure with the chamber 124 to rapidly change.

The purpose of the bleed valve 140 is to slowly change the pressure within the chamber 124, for example, when setting the pressure within the chamber 124 to set point. In one or more embodiments, the lever 116 causes the bleed valve 140 to open only while the center portion 168 of the lever 116 is disposed between positions indicated by reference lines 310 and 316. In one or more embodiments, the degree to which the bleed valve 140 is opened depends on the position of the lever 116, such that the closer the center portion 168 of the lever 116 is to the position indicated by the reference line 316, the greater the degree to which the bleed valve 140 is opened. Stated differently, as an angle β formed by the center portion 168 of the lever 116 and the reference line 310 increases, the degree to which the bleed valve 140 is opened increases. The rate at which a fluid (e.g., air) passes through the bleed valve 140 is proportional to the degree to which the bleed valve 140 is opened. Thus, the fluid passes through the bleed valve 140 most quickly while the bleed valve 140 is fully opened.

The needle valve 144 regulates the rate at which the fluid passes from the bleed valve 140 to the environment in which the pressure comparator apparatus 100 is disposed. The degree to which the needle valve 144 is opened can be adjusted during manufacturing to produce a predetermined restriction on the flow of fluid passing from the bleed valve 140 to the environment in which the pressure comparator apparatus 100 is disposed.

Figure 4A:
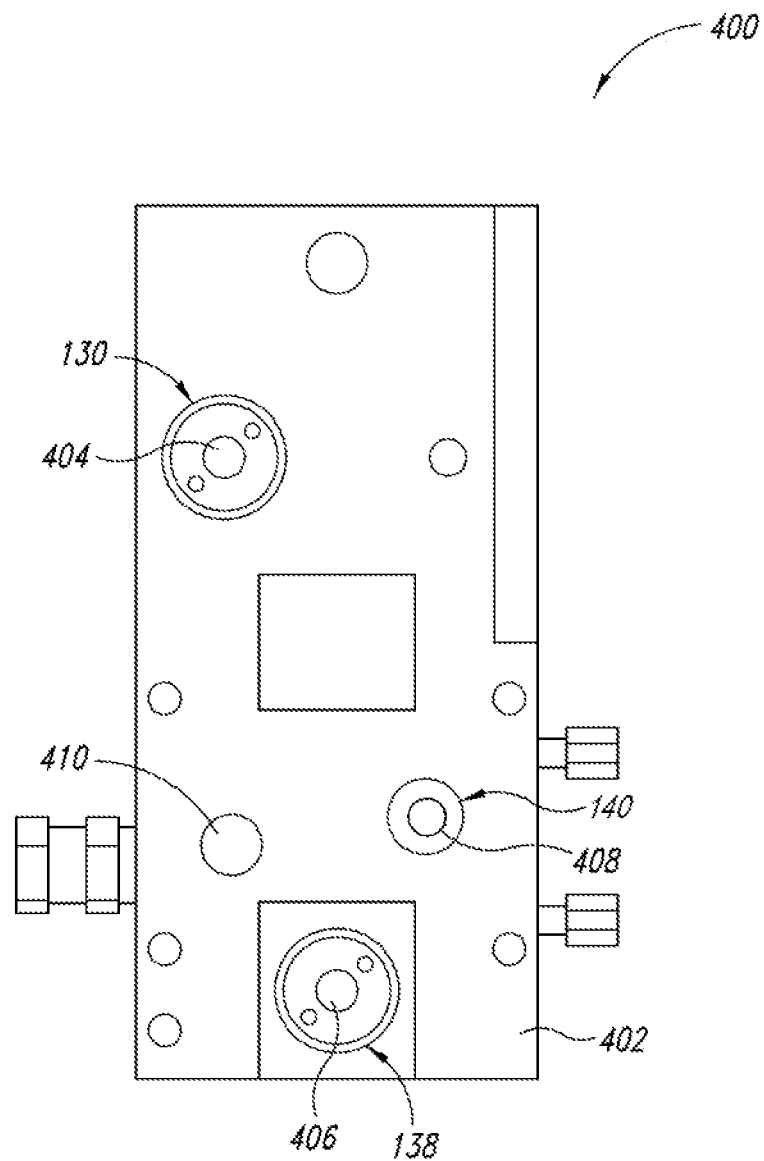
FIG. 4A is a top plan view of a partially-assembled valve assembly according to one or more embodiments of the present disclosure.

A lever assembly 400 according to one or more embodiments of the present disclosure is described below with reference to FIGS. 4A and 4B. FIG. 4A is top plan view of a partially-assembled lever assembly 400. The lever assembly 400 includes a pressure vacuum control chassis 402 having a plurality of conduits (not shown in FIGS. 4A and 4B) formed therein (e.g., the conduits 122, 128, 132, 136 and 142). In one or more embodiments, the conduits formed in the lever assembly 400 correspond to one or more of the conduits 122, 128, 132, 136, and 142 described above in connection with FIG. 2.

A plurality of apertures is formed in the pressure vacuum control chassis 402. Each of the apertures is fluidly coupled to at least one of the conduits. In one or more embodiments, an inner circumferential surface of each of the apertures has threads (not shown) formed thereon. Each of the isolation valve 130, the vent valve 138, and the bleed valve 140 includes matching threads (not shown) formed thereon. To secure the isolation valve 130, the vent valve 138, and the bleed valve 140 to the pressure vacuum control chassis 402, each is placed into one of the apertures and rotated to engage the threads formed thereon with the threads formed on a corresponding aperture. In addition to securing the isolation valve 130, the vent valve 138, and the bleed valve 140 to the pressure vacuum control chassis 402, the threads on the inner circumferential surface of each of the apertures formed in the pressure vacuum control chassis 402 and the matching threads on the isolation valve 130, the vent valve 138, and the bleed valve 140 ensure that the isolation valve 130, the vent valve 138, and the bleed valve 140 are fluidly coupled to the pressure vacuum control chassis 402 such that fluid does not pass through the threads. In other words, the threads on the inner circumferential surface of each of the apertures formed in the pressure vacuum control chassis 402 and the matching threads on the isolation valve 130, the vent valve 138, and the bleed valve 140 are used to create pressure fitting connections between the pressure vacuum control chassis 402 and the isolation valve 130, the vent valve 138, and the bleed valve 140.

Figure 5:
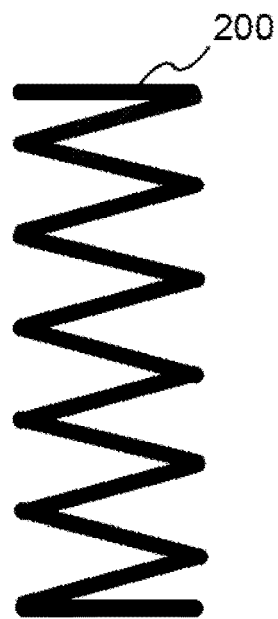
FIG. 5 is a side view of a compression spring according to one or more embodiments of the present disclosure.

The isolation valve 130 includes a plunger 404 that, while depressed, opens the isolation valve 130. While the plunger 404 is not depressed, a compression spring causes the plunger 404 to move upwardly, which closes the isolation valve 130. The vent valve 138 includes a plunger 406 that, while depressed, opens the vent valve 138. While the plunger 406 is not depressed, a compression spring causes the plunger 406 to move upwardly, which closes vent valve 138. The bleed valve 140 includes a plunger 408 that, while depressed, opens the bleed valve 140. While the plunger 408 is not depressed, a compression spring (not shown) causes the plunger 408 to move upwardly, which closes bleed valve 140. A spring assembly 410, which includes a compression spring (for example, compression spring 200 shown in FIG. 5) and a cap, is mounted on an upper surface of the pressure vacuum control chassis 402.

Figure 4B:
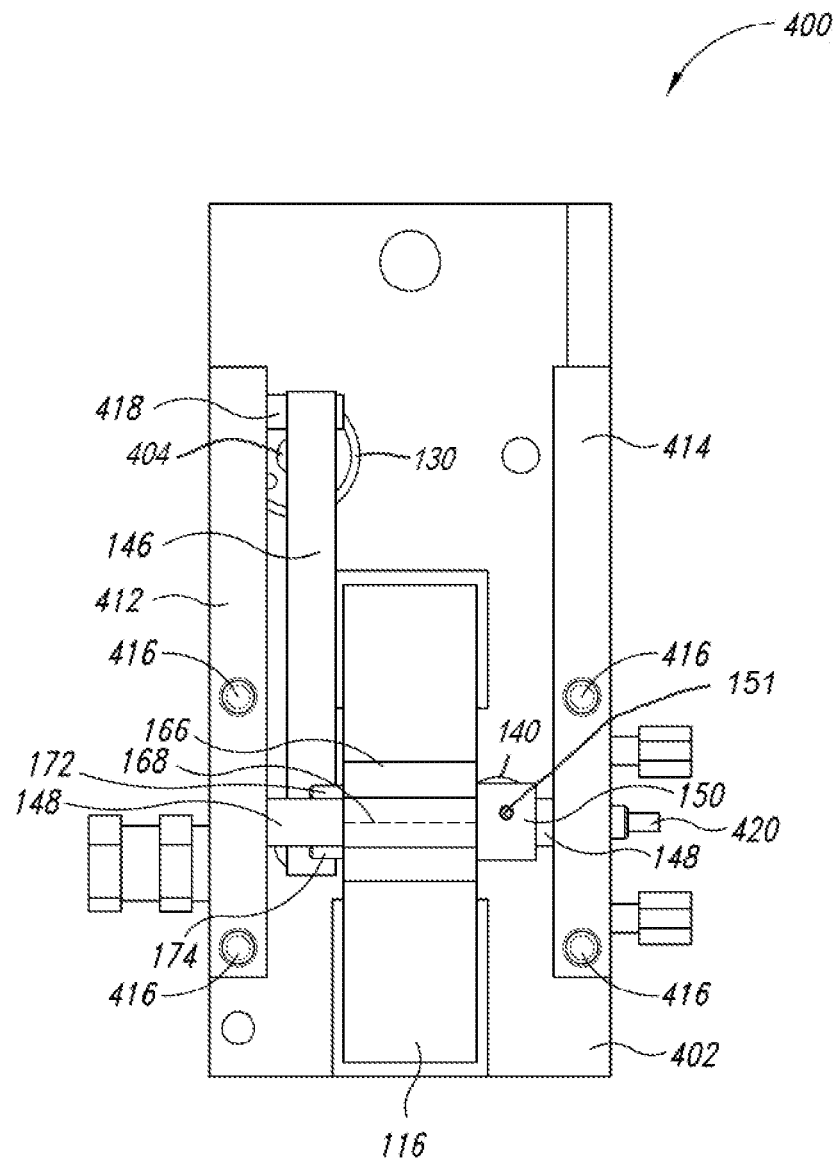
FIG. 4B is a top plan view of a fully-assembled valve assembly according to one or more embodiments of the present disclosure.

FIG. 4B is a top plan view of a fully-assembled lever assembly 400. The lever assembly 400 includes a first support arm 412 and a second support arm 414, which are attached to the pressure vacuum control chassis 402 by a plurality of screws 416. Each of the first support arm 412 and the second support arm 414 has an aperture formed therein. Portions of the shaft 148 are disposed within each of the apertures. The diameter of each of the apertures is slightly larger than the diameter of the shaft 148, which enables the shaft 148 to rotate. The shaft 148 is disposed within the aperture 170 (shown in FIGS. 3A and 3B) of the lever 116. In one or more embodiments, the lever 116 is attached to the shaft 148 using one or more screws (not shown). The actuator 150 is mounted to the shaft 148 such that rotation of the shaft 148 causes rotation of the actuator 150. In one or more embodiments, the actuator 150 is attached to the shaft 148 using one or more screws 151.

A shaft 418 projects outwardly from a side surface of the first support arm 412. An aperture is formed at one end of the actuator 146. A portion of the shaft 418 is disposed within the aperture of the actuator 146. The diameter of aperture of the actuator 146 is slightly larger than the diameter of the shaft 418, which enables the actuator 146 to pivot about the shaft 418.

It is noted that downward movement of the knob portion 166 of the lever 116 shown in FIG. 4B corresponds to leftward movement of the knob portion 166 of the lever 116 shown in FIG. 3A and rightward movement of the knob portion 166 of the lever 116 shown in FIG. 3B.

While the center portion 168 of the lever 116 shown in FIG. 4B is disposed within a first range of positions, the isolation valve 130, the vent valve 138, and the bleed valve 140 are closed. The first range of positions corresponds to positions between the reference lines 306 and 308 shown in FIG. 3A. The spring assembly 410 exerts a force upwardly on the actuator 146, which exerts a force upwardly on the lever 116 and causes it to return to a position within the first range of positions. The spring assembly 410 causes the lever 116 to return to a position within the first range of positions, after an operator has moved the knob portion 166 toward the reference line 302 shown in FIG. 3A and released the lever 116, for example. Additionally, the spring assembly 410 causes the lever 116 to return to a position within the first range of positions, after an operator has moved the knob portion 166 toward from the reference line 304 shown in FIG. 3A and released the lever 116, for example.

While the center portion 168 of the lever 116 shown in FIG. 4B is moved downwardly within a second range of positions, the isolation valve 130 is opened. The second range of positions corresponds to positions between the reference lines 306 and 302 shown in FIG. 3A. More particularly, while the center portion 168 of the lever 116 is within the second range of positions, the second projection 174 contacts the actuator 146 and causes it to pivot downwardly into contact with the plunger 404 of the isolation valve 130, which moves the plunger 404 downwardly thereby opening the isolation valve 130.

While the center portion 168 of the lever 116 shown in FIG. 4B is moved upwardly within a third range of positions, the isolation valve 130 is opened. The third range of positions corresponds to positions between the reference lines 304 and 308 shown in FIG. 3A. More particularly, while the center portion 168 of the lever 116 is within the third range of positions, the first projection 172 contacts the actuator 146 and causes it pivot downwardly into contact with the plunger 404 of the isolation valve 130, which moves the plunger 404 downwardly thereby opening the isolation valve 130.

While the center portion 168 of the lever 116 shown in FIG. 4B is moved downwardly within a fourth range of positions, the shaft 148 is disposed such that the actuator 150 contacts the plunger 408 of the bleed valve 140 and moves the plunger 408 downwardly, which causes the bleed valve 140 to open. The fourth range of positions corresponds to the positions between the reference lines 310 and 316 shown in FIG. 3A.

In one or more embodiments, the actuator 150 is a cam that has a variable width. The actuator 150 is disposed on the shaft 148 such that, as the center portion 168 of the lever 116 is moved from the position indicated by the reference line 310 to the position indicated by the reference line 316, the width of a portion of the actuator 150 that is disposed between the shaft 148 and the plunger 408 of the bleed valve 140 increases, which causes the plunger 416 to be depressed to a greater extent, thereby opening the bleed valve 140 to a greater extent. When the center portion 168 of the lever 116 is not within the fourth range of positions, the actuator 150 does not contact the plunger 408 and the bleed valve 140 remains closed.

While the center portion 168 of the lever 116 shown in FIG. 4B is moved downwardly within a fifth range of positions, a lower portion of the lever 116 contacts the plunger 406 of the vent valve 138 and moves the plunger 406 downwardly, which causes the vent valve 138 to open. The fifth range of positions corresponds to the positions between the reference lines 302 and 316 shown in FIG. 3A. When the center portion 168 of the lever 116 is not within the fifth range of positions, the lever 116 does not contact the plunger 406 and the vent valve 138 remains closed.

A coupling element 420 is attached to one end of the shaft 148. The coupling element 420 mechanically couples the shaft 148 to the variable resistor 154. For example, one end of the coupling element 420 is disposed within a slot formed in an end of the shaft 148 and an opposite end of the coupling element 420 is disposed within a slot formed in a portion the variable resistor 154. Rotation of the shaft 148 causes rotation of the coupling element 420 and the portion of the variable resistor 154, which changes the resistance of the variable resistor 154. In one or more embodiments, the coupling element 420 has a rectangular shape and is formed from metal.

While the center portion 168 of the lever 116 shown in FIG. 4B is moved upwardly within a sixth range of positions, the value of the resistance of the variable resistor 154 causes the control circuit 152 to provide the control signal 158 to the pump 134, which cause the pump 134 to operate, as described above. The sixth range of positions corresponds to the positions between the reference lines 304 and 314 shown in FIG. 3A. While the center portion 168 of the lever 116 shown in FIG. 4B is not within the sixth range of positions, the control circuit 152 does not provide the control signal 158 to the pump 134. As noted above, the spring assembly 410 causes the center portion 168 of the lever 116 to return to a position within the first range of positions, after an operator has moved and then released the lever 116. Accordingly, if an operator moves the center portion 168 of the lever 116 to a position within the sixth range of positions, for example, to increase the pressure in the chamber 124, and then the operator lets go of the lever 116, the spring assembly 410 causes the center portion 168 of the lever 116 to return to a position within the first range of positions, which causes the pump 134 to stop operating and the isolation valve 130 to close thereby preventing the pressure within the chamber 124 from changing.

Use of the pressure comparator apparatus 100 will now be described with reference to FIGS. 1, 2, and 3A. An operator couples a reference pressure gauge to the adapter 108 of the test port 102. The operator also couples a pressure measuring instrument that is being tested to the adapter 110 of the test port 104. The operator moves the knob 120 to a position that causes the pump 134 to develop positive pressure within the chamber 124. The operator then moves the center portion 168 of the lever 116 from a position within the range of positions between the reference lines 306 and 308 to a position corresponding to the reference line 304, which causes the isolation valve 130 to open and the pump 134 to quickly develop pressure within the chamber 124. The operator watches a display of the reference pressure gauge and as the pressure measured by the reference pressure gauge approaches the pressure of a set point, the operator moves the center portion 168 of the lever 116 toward to the reference line 314, which cause the pump 134 to more slowly develop pressure within the chamber 124. After the pressure measured by the reference pressure gauge is slightly greater than the pressure of the set point, the operator moves the center portion 168 of the lever 116 to a position within the range of positions between the reference lines 310 and 316, to open the isolation valve 130 and the bleed valve 140, which slowly reduces the pressure within the chamber 124, until the pressure measured by the reference pressure gauge is approximately equal to the pressure of the set point. The operator then moves the knob 114 to adjust the position of the piston 126 until the pressure measured by the reference pressure gauge is equal to the pressure of the set point. The operator then notes the pressure indicated by the pressure measuring instrument and calibrates the pressure measuring instrument, if necessary. The operator may repeat the above procedure for additional set points. At the conclusion of testing, the operator moves the center portion 168 of the lever to a position within the range of positions between the reference lines 302 and 316 to open the isolation valve 130 and the vent valve 138, which causes the pressure within the chamber 124 to become equal to the pressure within the environment in which the pressure comparator apparatus 100 is located. The operator also decouples the reference pressure gauge and the test measuring instrument from the first test port 102 and the second test port 104, respectively.

The various embodiments described above can be combined to provide further embodiments. For example, the lever 116 can be arranged to cause the vent valve 138 and the bleed valve 140 to open while the center portion 168 of the lever 116 shown in FIG. 4B is moved upwardly, instead of downwardly. Similarly, the control circuit 152 can be configured to provide the control signal 158 to the pump 134 while the center portion 168 of the lever 116 shown in FIG. 4B is moved downwardly, instead of upwardly. In addition, the actuators 146 and 150 may have shapes other than those described above. Moreover, the conduits described above may be combined. For example, although the conduits 132 and 136 are described as two separate conduits, they could be provided as a single conduit.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising: a chamber; a first valve coupled to the chamber; a support arm; an actuator pivotally mounted to the support arm, wherein the actuator causes the first valve to open while the actuator is at a first position; a pump coupled to the chamber; a control circuit coupled to the pump; and a lever coupled to the pump, the actuator, the first valve, and the control circuit, wherein operation of the pump and the first valve is controlled based on a position of the lever; and a second valve coupled to the chamber and the lever, wherein operation of the second valve is controlled based on the position of the lever.

2. The apparatus according to claim 1, further comprising a third valve coupled to the chamber and the lever, wherein operation of the third valve is controlled based on the position of the lever.

3. The apparatus according to claim 2 wherein, while the lever is at a first position, the first, the second, and the third valves are closed, and the control circuit controls the pump to be turned off, and wherein the lever is biased to be in the first position while the lever is not actuated by an operator.

4. The apparatus according to claim 3 wherein while the lever is at a second position, the first valve is open, the second and the third valves are closed, and the control circuit controls the pump to be turned on.

5. The apparatus according to claim 4 wherein, while the lever is at a third position, the first and the second valves are open, the third valve is closed, and the control circuit controls the pump to be turned off.

6. The apparatus according to claim 5 wherein, while the lever is at a fourth position, the first and the third valves are open, the second valve is closed, and the control circuit controls the pump to be turned off.

7. The apparatus according to claim 1 wherein the control circuit, in operation, provides a first control signal to the pump that causes the pump to be turned on while the lever is disposed at a first position and at a second position, and a duty cycle of the first control signal while the lever is disposed at the first position is different from the duty cycle of the first control signal while the lever is disposed at the second position.

8. The apparatus according to claim 7 wherein the control circuit, in operation, receives a second control signal that indicates a magnitude of a current flowing through the pump and, while the lever is disposed at the first position, the control circuit increases the duty cycle of the first control signal upon determining that the magnitude of the current flowing through the pump is greater than a threshold current value for a period of time greater than a threshold period of time.

9. An apparatus, comprising:
a first support arm;
a first actuator pivotally mounted to the first support arm;
a second support arm;
a shaft rotatably mounted between the first and the second support arms;
a second actuator mounted to the shaft, wherein rotation of the shaft causes rotation of the second actuator;
a lever coupled to the shaft, wherein movement of the lever causes rotation of the shaft;
a first valve disposed adjacent to the first actuator;
a second valve disposed adjacent to the second actuator;
a third valve disposed adjacent to the lever;
a pump; and
a control circuit coupled to the shaft, wherein operation of the pump, the first valve, the second valve, and the third valve is controlled based on a position of the lever.

10. The apparatus according to claim 9 wherein, while the lever is at a first position, the first, the second, and the third valves are closed, and the control circuit controls the pump to be off, and wherein the lever is biased to be in the first position while the lever is not actuated by an operator.

11. The apparatus according to claim 10 wherein, while the lever is at a second position, the first actuator depresses a plunger of the first valve causing the first valve to open, the second and third valves are closed, and the control circuit controls the pump to be on.

12. The apparatus according to claim 11 wherein, while the lever is at a third position, the first actuator depresses the plunger of the first valve causing the first valve to open, the second actuator depresses a plunger of the second valve causing the second valve to open, the third valve is closed, and the control circuit controls the pump to be off.

13. The apparatus according to claim 12 wherein, while the lever is at a fourth position, the first actuator depresses the plunger of the first valve causing the first valve to open, the second valve is closed, the lever depresses a plunger of the third valve causing the third valve to open, and the control circuit controls the pump to be off.

14. The apparatus according to claim 9 wherein the control circuit provides a first control signal to the pump that causes the pump to be on while the lever is disposed at a first position and at a second position, and a duty cycle of the first control signal while the lever is disposed at the first position is different from the duty cycle of the first control signal while the lever is disposed at the second position.

15. The apparatus according to claim 14 wherein the control circuit receives a second control signal indicating a magnitude of a current flowing through the pump and, while the lever is disposed at the first position, the control circuit increases the duty cycle of the first control signal upon determining that the magnitude of the current flowing through the pump is greater than a threshold current value for a period of time greater than a threshold period of time.

16. The apparatus according to claim 9, comprising:
a first projection extending outwardly from a surface of the lever, wherein, while the lever is disposed at a first position, the first projection contacts the first actuator and the first actuator depresses a plunger of the first valve causing the first valve to open; and
a second projection extending outwardly from the surface of the lever, wherein, while the lever is disposed at a second position, the second projection contacts the first actuator and the first actuator depresses the plunger of the first valve causing the first valve to open.

17. The apparatus according to claim 9 wherein the second actuator comprises a cam.

18. The apparatus according to claim 17 wherein, while the lever is disposed at a first position, the cam depresses a plunger of the second valve causing the second valve to open by a first amount and, while the lever is disposed at a second position, the cam depresses the plunger of the second valve causing the second valve to open by a second amount that is different from the first amount.

19. The apparatus according to claim 9 wherein the control circuit includes a variable resistor that is coupled to the shaft, and rotation of the shaft changes a resistance of the variable resistor.

\* \* \* \* \*